United States Patent
Moradnia

(10) Patent No.: US 12,365,402 B2
(45) Date of Patent: Jul. 22, 2025

(54) SPINNER ASSEMBLY FOR A VEHICLE

(71) Applicant: Honda Motor Co., Ltd., Tokyo (JP)

(72) Inventor: Pirooz Moradnia, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 421 days.

(21) Appl. No.: 18/153,868

(22) Filed: Jan. 12, 2023

(65) Prior Publication Data
US 2024/0239420 A1    Jul. 18, 2024

(51) Int. Cl.
*B62D 35/00*        (2006.01)

(52) U.S. Cl.
CPC .................... *B62D 35/00* (2013.01)

(58) Field of Classification Search
CPC ................ B62D 35/00; B62D 37/00
See application file for complete search history.

(56) References Cited

U.S. PATENT DOCUMENTS

| | | | | |
|---|---|---|---|---|
| 2,569,983 A * | 10/1951 | Favre | ............... | B62D 35/00 |
| | | | | 244/206 |
| 4,502,724 A * | 3/1985 | Grenadier | ............ | B62D 35/001 |
| | | | | 296/180.1 |
| 6,926,346 B1 | 8/2005 | Wong et al. | | |
| 9,849,922 B2 | 12/2017 | De Luca | | |
| 9,950,751 B2 | 4/2018 | Heil et al. | | |
| 10,309,373 B1 * | 6/2019 | Serramalera | ........ | F03D 3/0463 |
| 11,230,329 B1 | 1/2022 | White | | |
| 2007/0046067 A1 | 3/2007 | Verona | | |
| 2019/0092403 A1 | 3/2019 | Bray et al. | | |

FOREIGN PATENT DOCUMENTS

| | | | | |
|---|---|---|---|---|
| CN | 203581155 U | 5/2014 | | |
| CN | 109305234 A | 2/2019 | | |
| FR | 2854858 A1 | 6/2006 | | |
| FR | 2980155 A1 | 3/2013 | | |
| JP | H08239062 A | 9/1996 | | |
| JP | 2007191085 A | 8/2007 | | |
| JP | 2009208657 A | 9/2009 | | |
| JP | 2010143530 A | 7/2010 | | |
| KR | 970038500 U | 7/1997 | | |
| WO | WO-2005008042 A1 * | 1/2005 | ............. | F01B 3/045 |
| WO | 2007138212 A1 | 12/2007 | | |

OTHER PUBLICATIONS

DE 10145243 A1 (Year: 2002).*
WO 2022248385 A1 (Year: 2022).*

* cited by examiner

*Primary Examiner* — Lori Lyjak
(74) *Attorney, Agent, or Firm* — Morgan Lincoln; American Honda Motor Co., Inc.

(57) ABSTRACT

A spinner assembly for a vehicle includes a spinner defining a central axis and configured to rotate about the central axis, and a support structure arranged opposite to the spinner. The spinner assembly also includes an endless belt supported on the spinner and the support structure and configured to move linearly in response to the rotation of the spinner about the central axis. The endless belt loops around the spinner and the support structure.

20 Claims, 3 Drawing Sheets

SPINNER ASSEMBLY FOR A VEHICLE

BACKGROUND

The disclosed subject matter relates, generally, to a vehicle. More particularly, the disclosed subject matter relates a spinner assembly for a vehicle to control air flow along an exterior surface of the vehicle.

A good airflow quality around a vehicle body is essential in achieving good aerodynamic characteristics, such as, drag and lift. Therefore, it is important to ensure that the airflow around a vehicle is well-attached over the length of the vehicle. Airflow around a vehicle can separate from the vehicle's body in certain circumstances, such as, due to geometry of the vehicle, non-ideal driving conditions, such as sidewind, etc. Airflow separation generally impacts the vehicle's aerodynamic performance (drag & lift), and therefore has direct implications on the vehicle's energy efficiency as well as driving or ride experience.

Currently, air flow control devices, such as spinners, are mounted along the exterior surface of the vehicle to control air flow along the exterior surface. Typically, spinners 10, shown in FIG. 1, that can rotate in both directions, are arranged at various locations of the vehicle 12. The spinners 12 typically include cylindrical or conical structures and guide the flow of air to minimize the air separation at the associated locations of the external surface 14. However, as seen from FIG. 1, the spinners 10 may create discontinuity in the geometry of the exterior surface 14 of the vehicle 12 due to a portion of the spinner 10 protruding outwardly of the exterior surface 14, which may be undesirable. Moreover, surface area of such spinners 10 is relatively small so as to avoid surface discontinuity. However, due to the smaller surface area of the spinners 10, the spinners 10 are generally less effective in controlling the air flow along the exterior surface 14.

SUMMARY

In accordance with one embodiment of the present disclosure, a spinner assembly for a vehicle is provided. The spinner assembly includes a spinner defining a central axis and configured to rotate about the central axis, and a support structure arranged opposite to the spinner. The spinner assembly also includes an endless belt supported on the spinner and the support structure and configured to move linearly in response to the rotation of the spinner about the central axis. The endless belt loops around the spinner and the support structure.

In accordance with another embodiment of the present disclosure, a vehicle is provided. The vehicle includes a car body defining an exterior surface of the vehicle, and at least one spinner assembly mounted to the car body and configured to control a separation of air along at least a portion of the exterior surface of the vehicle. The spinner assembly includes a spinner defining a central axis and configured to rotate about the central axis, and a support structure arranged opposite to the spinner. The spinner assembly further includes an endless belt supported on the spinner and the support structure and configured to move linearly in response to the rotation of the spinner about the central axis. The endless belt loops around the spinner and the support structure.

In accordance with yet a further embodiment of the present disclosure a spinner assembly for a vehicle is disclosed. The spinner assembly includes a spinner defining a central axis and configured to rotate about the central axis, and a roller arranged opposite to the spinner and configured to rotate about a central longitudinal axis. The spinner assembly also includes an endless belt supported on the spinner and the roller and configured to move linearly in response to the rotation of the spinner about the central axis. The endless belt loops around the spinner and the roller. The spinner assembly also includes at least one of an injector or a suction apparatus to control an amount of air flow along an exterior surface of the vehicle.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 2-3, wherein like numbers indicate the same or corresponding elements throughout the views.

Figure 2:
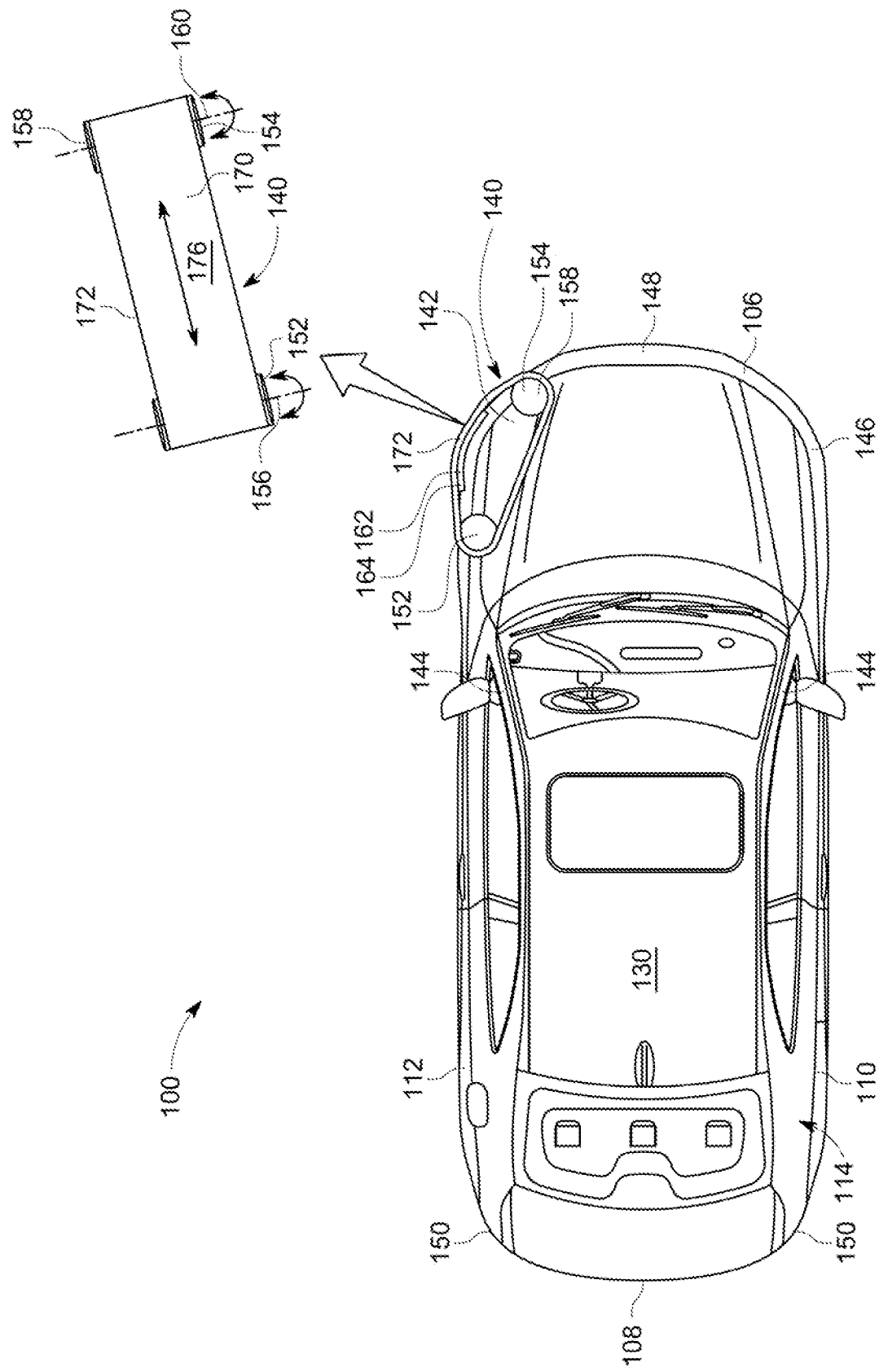
FIG. 2 is a top view of a vehicle having a spinner assembly, in accordance with one embodiment of the present disclosure.

FIG. 2 illustrates a top view of a vehicle 100, in accordance with one embodiment of the disclosure. As shown, the vehicle 100 is shown as a sedan. However, the vehicles 100 in accordance with alternative embodiments can comprise any variety of vehicles, including hatchbacks, multi-utility vehicles, sport utility vehicles, trucks, etc., for example.

As shown, the vehicle 100 includes a front end 106, a rear end 108, a first longitudinal side 110, a second longitudinal side 112, and a car body 114 extending from the front end 106 to the rear end 108. The car body 114 is supported on a plurality of traction members, for example, wheels (not shown), to support the vehicle 100 on a surface, for example, a ground, and to enable a movement of the vehicle 100 over the surface. The car body 114 may support various components and/or assemblies of the vehicle 100. Further, the vehicle 100 includes an engine module (not shown) having an engine and a transmission assembly operatively connected to the engine and adapted to transmit power from the engine to the wheels of the vehicle 100. In an embodiment, the engine may be an internal combustion engine or an electric motor, of any suitable size and configuration for providing a motive power to the vehicle 100. In one embodiment, the engine module may be supported by the front portion of the car body 114.

Additionally, the car body 114 defines an exterior surface 130 of the vehicle 100 that interacts with external environment to the vehicle 100. It may be appreciated that the car body 114 is a streamlined body to enable desired air flow characteristics along the exterior surface 130 so that desired aerodynamic characteristics (drag & lift) are achieved. To ensure that the desired air flow pattern or characteristics along the exterior surface 130 of the vehicle 100 and to ensure that the air flow is controlled over the length of the vehicle 100, and to control air flow separation along one or more portions of the exterior surface 130, the vehicle 100 includes at least one spinner assembly 140 mounted to the car body 114 and controlling an air flow along the one or more portions of the exterior surface 130. In some embodiments, the spinner assemblies 140 may facilitate in restricting or minimizing the air flow separation along one or more portion of the exterior surface 130. Alternatively, one or more spinner assemblies 140 may be configured/operated to create/promote a local air flow separation. For example, in some scenarios, for example, to cancel a lift force or a sideward force acting on the vehicle 100, the one or more spinner assemblies 140 may be configured/controlled to create/promote local air flow separation.

In an embodiment, a single spinner assembly 140 is shown to be mounted at left front corner 142 of the vehicle 100, however, it can be envisioned that the vehicle 100 may include any number of spinner assembles 140 and the spinner assemblies 140 may be mounted at any locations along the exterior surface 130 at which the air flow separation is detected/achieved and/or to be controlled. For example, the spinner assemblies 130 may be mounted on one or more pillars 144, for example, 'A' pillars, right front corner 146, proximate to radiator grill 148, rear corners 150, or any other such locations.

Figure 1:
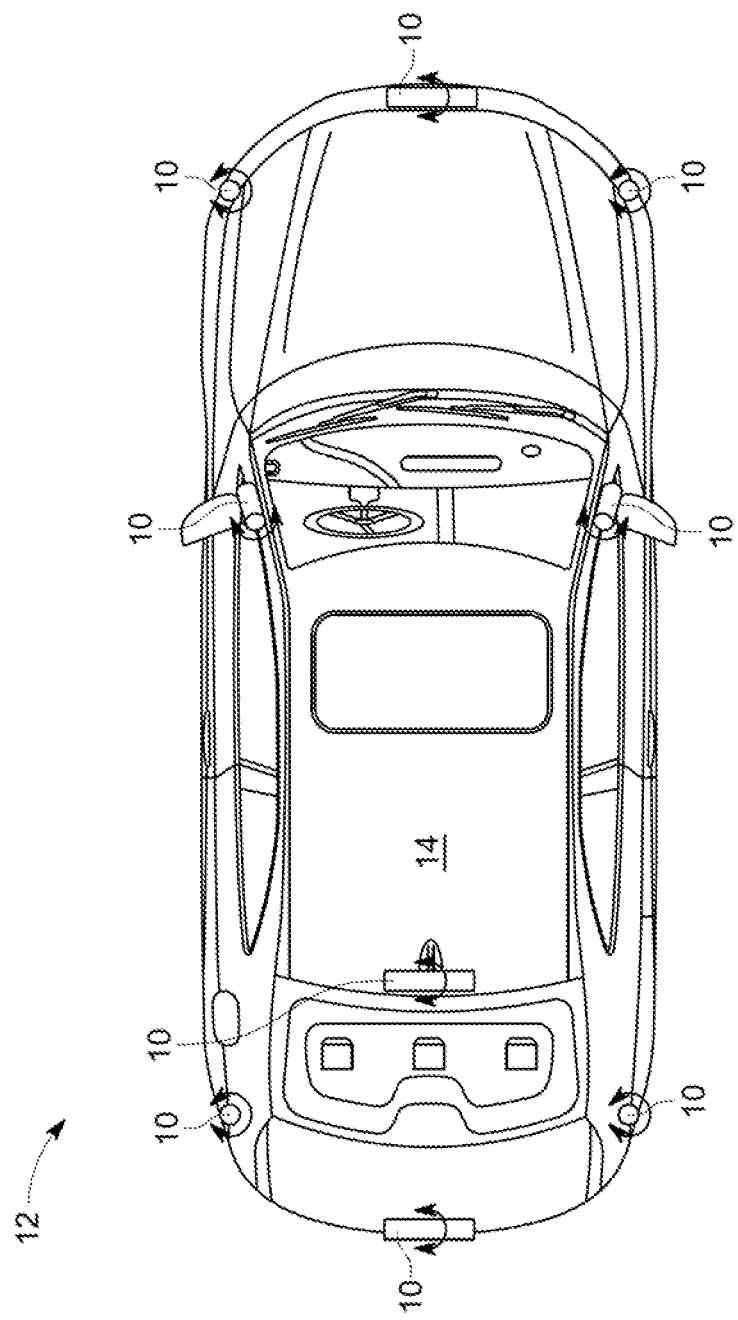
FIG. 1 is a top view of a vehicle having spinners arranged along an exterior surface of the vehicle and as is known in the prior art.

As shown in FIG. 1 and FIG. 2, the spinner assembly 140 includes a spinner 152, for example, a first spinner 152, configured to rotate about its central axis 156 and a support structure 154 arranged spaced apart from the first spinner 152. As shown, the first spinner 152 is a roller having a cylindrical body and may act as a driver roller. Although, the first spinner 152 is shown and contemplated as the roller, it may be appreciated that the first spinner 152 may include any other shape, such as, but not limited to, a cone, a sphere, cylinder, or any other suitable shape that can rotated about its central axis is also possible. Also, the first spinner 152 is rotated about its central axis 156 by a suitable actuator (not shown), for example, an electric motor. In an embodiment, the first spinner 152 is configured to rotate in two directions, i.e., a first direction and a second direction opposite to the first direction, about the central axis 156.

Further, the support structure 154 is arranged spaced apart from the first spinner 152 and may be arranged substantially parallel to the first spinner 152. In the illustrated embodiment, the support structure 156 is a spinner 158 (referred to as second spinner 158) that is adapted to rotate about its central axis 160. Although the support structure 154 is contemplated as the rotating spinner 158, it may be appreciated that the support structure 154 be a stationary support structure having an arcuate shape with an axis of the support structure 154 being arranged substantially parallel to the central axis 156 of the first spinner 152. As with the first spinner 152, the second spinner 158 may be a roller having a substantially cylindrical shape. However, the second spinner 158 may include any other shape, such as, but not limited to, cone, truncated cone, sphere, etc. Further, the second spinner 158 may be rotated/driven by the first spinner 152, and hence may be a driven spinner. Alternatively, the second spinner 158 may be a drive spinner that is rotated by an actuator independently of the first spinner 152.

Further, the spinner assembly 140 includes an endless belt 170 supported on the first spinner 152 and the support structure 154 i.e., the second spinner 158 and configured to move linearly in response to the rotation of the first spinner 152 and/or the second spinner 158 about respective central axis 156, 160. As shown, the endless belt 170 loops around the first spinner 152 and the support structure 154 (i.e., the second spinner 158). In an embodiment, the endless belt 170 is an elastic belt configured to stretch or expand upon application of a tensile force. Alternatively, the endless belt 170 may be a non-elastic belt. As shown, the endless belt 170 includes a first portion 172 (i.e., upper portion 172) extending between the first spinner 152 and the second spinner 158, and extending along the exterior surface 130 of the car body 114. Also, the endless belt 170 includes a second portion arranged substantially parallel to the first portion and disposed inwardly of the exterior surface 130 of the car body 114. In an embodiment, the spinner assembly 140 is mounted to the car body 114 such that an upper surface 176 of the upper portion 172 of the endless belt 170 is arranged/disposed substantially flush with a portion of the exterior surface 130 arranged in the vicinity of the spinner assembly 140. Due to the large surface area provided by the endless belt 170, the spinner assembly 140 enables improved air flow control along the exterior surface 130, keeping the air flow attached to the exterior surface 130.

In an embodiment, the first spinner 152 and the second spinner 158 are moved/rotated in the same direction when the spinner assembly 140 is actuated to control the air flow along the exterior surface 130. The spinners 152, 158 and hence the belt 170 may be moved in direction substantially parallel to a direction of air flow in the vicinity of the spinner assembly 140. In some embodiments, the spinners 152, 158 and hence the belt 170 may be moved in a direction opposite to the direction of air flow in the vicinity of the spinner assembly 140. In some embodiments, only one spinner, for example, the first spinner 152, is actuated. In some embodiments, the first and/or the second spinners 152, 158 are simultaneously operated/rotated, while it may be appreciated that the first spinner 152 and/or the second spinner 158 may be independently rotated/actuated. In some embodiments, the first and/or the second spinners 152, 158 may be actuated depending on one or more parameters, for example, an air pressure outside the vehicle 100, a speed of the vehicle 100, an air temperature, a speed of the air flowing outside the vehicle 100, a geometry/shape of the exterior surface 130 of the car body 114 proximate to the mounting of the spinner assembly 140, etc. In an example embodiment, the vehicle 100 may include one or more sensors to detect/determine one or more parameters and predict/detect an occurrence of the air flow separation in the vicinity of the spinner assembly 140, and controls the actuation of the first spinner 152 and/or the second spinner 158 to reduce/prevent/increase the air separation, i.e., to control the air flow in the vicinity of the spinner assembly 140. In some embodiments, the directions and the speed of the rotations of the first spinner 152 and the second spinner 158 may be controlled depending on the predicted and/or actual air flow separation. In some embodiments, the spinner assembly 140 may be activated/deactivated manually i.e., by a driver of the vehicle 100.

Additionally, the spinner assembly 140 may include a guide structure 162, as shown in FIG. 2, arranged inside a gap defined between the first spinner 152 and the second spinner 158 (i.e., support structure 154) to support the endless belt 170 and guide the endless belt 170 to follow a contour of the exterior surface 130 of the car body 114. Accordingly, the guide structure 162 may restrict/prevent/ eliminate a discontinuity in the exterior surface 130 due to the presence/mounting of the spinners 152, 158. In the illustrated embodiment, the guide structure 162 is a plate 164 having an arcuate shape and supports the upper portion 172 of the endless belt 170. However, it may be envisioned that the guide structure 162 may include any shape complimentary to a shape of the contour of the exterior surface 130 along which the spinner assembly 140 or the endless belt 170 extends.

Figure 3:
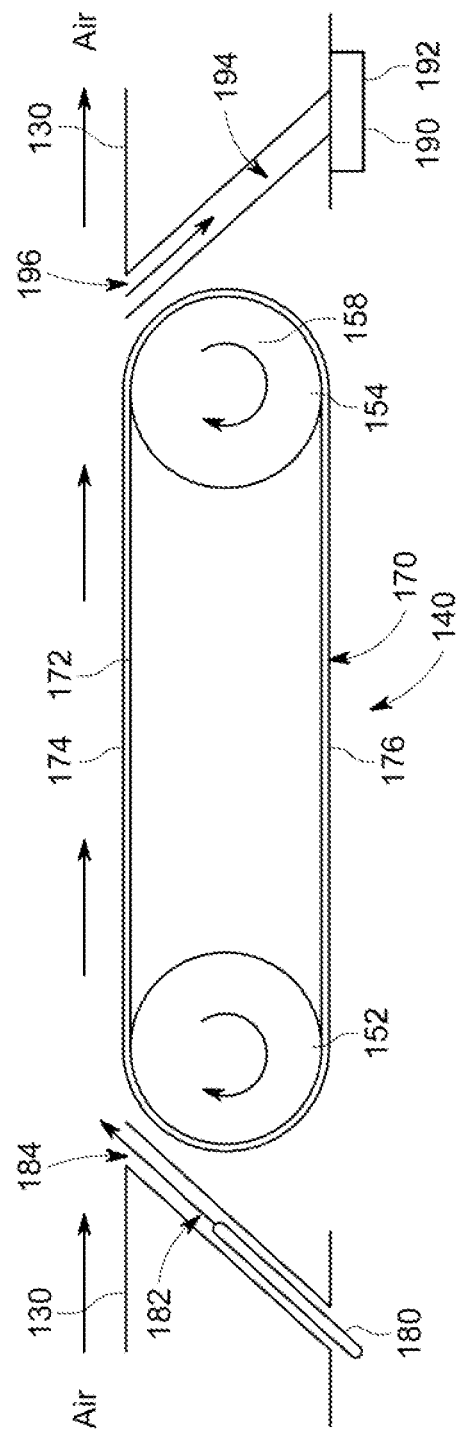
FIG. 3 is a schematic view of a portion of the vehicle depicting a spinner assembly having an injector and a suction apparatus, in accordance with one embodiment of the present disclosure.

Further, in alternative embodiments, referring to FIG. 3, the spinner assembly 140 may include an injector 180 for injecting air in a vicinity of the exterior surface 130 of the car body 114. As illustrated in FIG. 3, the injector 180 is positioned proximate to the first spinner 152. However, it may be appreciated that the injector 180 may be positioned proximate to the second spinner 158. As shown, the injector 180 is located/positioned such that the first spinner 180 is arranged between the injector 180 and the second spinner 158 or the endless belt 170. In an embodiment, as shown in FIG. 3, the upper portion 172 of the endless belt 170 moves in a first direction, and in such a case, the injector 180 is configured to inject air upstream of the endless belt 170. However, the injector 180 may be configured to inject air downstream relative to the direction of movement of the endless belt 170. As shown, the injector 180 may be arranged inside a channel 182 defined by the car body 114, and the air exit the channel 182 through one or more holes 184 defined by the exterior surface 130. In an embodiment, a velocity and an amount of injected air is controlled based on the air flow in the vicinity of the exterior surface 130. In an embodiment, the vehicle 100 may include an air source (not shown), for example, a compressor, and the injector 180 is fluidly connected with the air source to receive the air from the air source.

Similar to the injector 180, the spinner assembly 140 may include a suction apparatus 190, for example, a fan 192, to extract a portion of air flowing along the exterior surface 130 and in the vicinity of the spinner assembly 140. In the illustrated embodiment, the suction apparatus 190 is shown to be arranged/located proximate to the second spinner 158 such that the second spinner 158 is disposed between the first spinner 152 and the suction apparatus 190. However, it may be appreciated that the suction apparatus 190 may be located proximate to the first spinner 152 such that the first spinner 152 is arranged between the second spinner 158 and the suction apparatus 190. In an embodiment, as shown in FIG. 3, the upper portion 172 of the endless belt 170 is moved in a first direction, and in such a case, the suction apparatus 190 is configured to extract air from a location downstream of the second spinner 158 relative to direction of motion of the upper portion 170 of the endless belt 170. However, the suction apparatus 190 may be configured to extract air from a location upstream of the first spinner 152 relative to direction of movement of upper portion 172 of the endless belt 170. In an embodiment, an amount of extracted air may be controlled by controlling the suction apparatus 190 based on the air flow in the vicinity of the exterior surface 130 of the car body 114. As shown, car body 114 defines an outlet channel 194 having one or more ports 196 defined at the exterior surface to facilitate the extraction of at least a portion of air flowing along the exterior surface 130.

Although the spinner assembly 140 having both the injector 180 and the suction apparatus 190 is shown, it may be appreciated that either the injector 180 or suction apparatus 190 may be omitted. Further, in some embodiments, the spinner assembly 140 may include two suction appara-tuses 190, one arranged proximate to the second spinner 158 and other arranged proximate to the first spinner 152 instead of the injector 180. Similarly, in some embodiments, the spinner assembly 140 may include two injectors 180, one arranged proximate to the first spinner 152 and other arranged proximate to the second spinner 158 instead of the suction apparatus 190.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A spinner assembly for a vehicle, the spinner assembly comprising:
   a spinner defining a central axis and configured to rotate about the central axis;
   a support structure arranged opposite to the spinner; and
   an endless belt supported on the spinner and the support structure and configured to move linearly in response to the rotation of the spinner about the central axis, wherein the endless belt loops around the spinner and the support structure.

2. The spinner assembly of claim 1, wherein the spinner is a driving body to facilitate the linear movement of the endless belt.

3. The spinner assembly of claim 1, wherein the support structure includes a roller having a central axis, wherein the roller is a driven roller configured to rotate about the central axis in response to linear movement of the endless belt.

4. The spinner assembly of claim 1, wherein the spinner is a first spinner and the support structure is a second spinner.

5. The spinner assembly of claim 1, wherein the endless belt is an elastic belt.

6. The spinner assembly of claim 1, wherein the endless belt is a non-elastic belt.

7. The spinner assembly of claim 1 further including a guide structure arranged between the spinner and the support structure for supporting and guiding the endless belt.

8. The spinner assembly of claim 1 further including an injector for injecting air in a vicinity of the spinner or the support structure.

9. The spinner assembly of claim 1 further including a suction apparatus for removing at least a portion of air flowing in a vicinity of the spinner or support structure.

10. A vehicle, comprising:
    a car body defining an exterior surface of the vehicle; and
    at least one spinner assembly mounted to the car body and configured to control a separation of air along at least a portion of the exterior surface of the vehicle, the spinner assembly including
    a spinner defining a central axis and configured to rotate about the central axis,
    a support structure arranged opposite to the spinner, and
    an endless belt supported on the spinner and the support structure and configured to move linearly in response to the rotation of the spinner about the central axis, wherein the endless belt loops around the spinner and the support structure.

11. The vehicle of claim 10, wherein the spinner is a driving body to facilitate the linear movement of the endless belt.

12. The vehicle of claim 10, wherein the support structure includes a roller having a central axis, wherein the roller is a driven roller configured to rotate about the central axis in response to linear movement of the endless belt.

13. The vehicle of claim 10, wherein the spinner is a first spinner and the support structure is a second spinner.

14. The vehicle of claim 10, wherein the spinner assembly includes a guide structure arranged between the spinner and the support structure and configured to guide the endless belt along a contour of the exterior surface.

15. The vehicle of claim 10 further including an injector for injecting air in a vicinity of the exterior surface of the car body.

16. The vehicle of claim 10 further including a suction apparatus for removing at least a portion of air flowing along the exterior surface of the car body.

17. A spinner assembly for a vehicle to control a flow of air along an exterior surface of the vehicle, the spinner assembly comprising:

a spinner defining a central axis and configured to rotate about the central axis;

a roller arranged opposite to the spinner and configured to rotate about a central longitudinal axis;

an endless belt supported on the spinner and the roller and configured to move linearly in response to the rotation of the spinner about the central axis, wherein the endless belt loops around the spinner and the roller; and at least one of an injector or a suction apparatus to control an amount of air flow along an exterior surface of the vehicle.

18. The spinner assembly of claim 17, wherein the spinner is a driving body to facilitate the linear movement of the endless belt, and the roller is a driven roller configured to rotate in response to the linear movement of the endless belt.

19. The spinner assembly of claim 17, wherein the spinner is a first spinner and the roller is a second spinner.

20. The spinner assembly of claim 17 further including a guide structure arranged between the spinner and the roller for supporting and guiding the endless belt.

* * * * *